(12) United States Patent
Li (10) Patent No.: US 12,259,622 B2
(45) Date of Patent: Mar. 25, 2025

(54) LIQUID CRYSTAL DISPLAY PANEL AND DISPLAY DEVICE INCLUDING SUB PIXELS WITH CHANGEABLE POLARITIES

(71) Applicant: TCL CHINA STAR OPTOELECTRONICS TECHNOLOGY CO., LTD., Shenzhen (CN)

(72) Inventor: Lixia Li, Shenzhen (CN)

(73) Assignee: TLC CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/772,246

(22) PCT Filed: Apr. 19, 2022

(86) PCT No.: PCT/CN2022/087663
§ 371 (c)(1),
(2) Date: Apr. 27, 2022

(87) PCT Pub. No.: WO2023/193294
PCT Pub. Date: Oct. 12, 2023

(65) Prior Publication Data
US 2024/0142835 A1    May 2, 2024

(30) Foreign Application Priority Data
Apr. 6, 2022    (CN) .......................... 202210359681.5

(51) Int. Cl.
*G02F 1/1362*        (2006.01)
*G09G 3/36*          (2006.01)

(52) U.S. Cl.
CPC ..... *G02F 1/136286* (2013.01); *G09G 3/3614* (2013.01); *G09G 2300/0452* (2013.01);
(Continued)

(58) Field of Classification Search
CPC ............ G02F 1/136286; G09G 3/3614; G09G 2300/0452; G09G 2320/0209; G09G 2330/021
See application file for complete search history.

(56) References Cited

U.S. PATENT DOCUMENTS

2007/0132684 A1* 6/2007 Baek .................... G09G 3/3614
345/87
2011/0315991 A1   12/2011 Sugihara et al.
(Continued)

FOREIGN PATENT DOCUMENTS

CN        101562003 A     10/2009
CN        104698648 A      6/2015
(Continued)

OTHER PUBLICATIONS

Chinese Office Action issued in corresponding Chinese Patent Application No. 202210359681.5 dated May 30, 2023, pp. 1-8, 19pp.
(Continued)

*Primary Examiner* — Kwang-Su Yang
(74) *Attorney, Agent, or Firm* — The Roy Gross Law Firm, LLC; Roy Gross (57) ABSTRACT

The present application provides a liquid crystal display panel and a display device. The liquid crystal display panel includes a plurality of scanning lines, a plurality of data lines, and a plurality of sub pixels. Wherein colors of the sub pixels in each column are same; polarities of the sub pixels in each column are changed every k rows, and polarities of two adjacent ones of the sub pixels in each row are opposite; and every two of the data lines transmitting data voltages with same polarities and electrically connected to the sub pixels of a same color are connected together, and k and n are integers greater than or equal to 1.

19 Claims, 9 Drawing Sheets

(52) U.S. Cl.
CPC .............. *G09G 2320/0209* (2013.01); *G09G 2330/021* (2013.01)

(56) References Cited

U.S. PATENT DOCUMENTS

| | | | | |
|---|---|---|---|---|
| 2012/0105777 | A1* | 5/2012 | Lee | H01L 27/124 |
| | | | | 257/E21.328 |
| 2014/0218347 | A1* | 8/2014 | Lee | G09G 3/3677 |
| | | | | 349/48 |
| 2014/0266995 | A1* | 9/2014 | Cho | G09G 3/3607 |
| | | | | 345/88 |
| 2018/0211617 | A1* | 7/2018 | Li | G09G 3/3614 |
| 2020/0312251 | A1* | 10/2020 | Kim | G09G 3/3291 |
| 2021/0174721 | A1* | 6/2021 | Hsu | G09G 3/20 |
| 2021/0223651 | A1* | 7/2021 | Nakagawa | G02F 1/136286 |
| 2022/0123215 | A1* | 4/2022 | Jo | H10K 59/80517 |

FOREIGN PATENT DOCUMENTS

| | | |
|---|---|---|
| CN | 104880874 A | 9/2015 |
| CN | 105068349 A | 11/2015 |
| CN | 105158997 A | 12/2015 |
| CN | 105702226 A | 6/2016 |
| CN | 106094380 A | 11/2016 |
| CN | 106444196 A | 2/2017 |
| CN | 206619376 U | 11/2017 |
| CN | 110208995 A | 9/2019 |
| CN | 110264969 A | 9/2019 |
| CN | 110265408 A | 9/2019 |
| CN | 111061106 A | 4/2020 |
| CN | 111123598 A | 5/2020 |
| CN | 112017610 A | 12/2020 |
| CN | 112445038 A | 3/2021 |
| CN | 112908234 A | 6/2021 |
| KR | 20080001052 A | 1/2008 |

OTHER PUBLICATIONS

Chinese Decision of Rejection issued in corresponding Chinese Patent Application No. 202210359681.5 dated Aug. 18, 2023, pp. 1-4, 10pp.

PCT International Search Report for International Application No. PCT/CN2022/087663, mailed on Dec. 15, 2022.

PCT Written Opinion of the International Search Authority for International Application No. PCT/CN2022/087663, mailed on Dec. 15, 2022.

* cited by examiner

LIQUID CRYSTAL DISPLAY PANEL AND DISPLAY DEVICE INCLUDING SUB PIXELS WITH CHANGEABLE POLARITIES

CROSS REFERENCE TO RELATED APPLICATIONS

This application is a National Phase of PCT Patent Application No. PCT/CN2022/087663 having International filing date of Apr. 19, 2022, which claims the benefit of priority of Chinese Patent Application No. 202210359681.5, filed Apr. 6, 2022, the contents of which are all incorporated herein by reference in their entirety.

BACKGROUND OF INVENTION

Field of Invention

The present application relates to a field of display technology, and particularly to a liquid crystal display panel and a display device.

Description of Prior Art

With progress of science and technology, liquid crystal display panels have been widely used in a variety of electronic products because of advantages such as light and thin bodies, low power consumption, and no radiation, etc. As far as the liquid crystal display panels are concerned, liquid crystal molecules cannot be fixed at certain voltage all the time and remain unchanged, otherwise, over a long period of time, even if voltage is cancelled, the liquid crystal molecules will no longer be able to rotate according to changes of electric fields due to destruction of characteristics. Therefore, it is necessary to apply an opposite voltage with positive and negative polarities to the liquid crystals to drive them. At present, there are four common polar array modes of liquid crystal panels: frame inversion, column inversion, row inversion, and dot inversion.

A problem of color crosstalk often exists in the liquid crystal display panels. The color crosstalk refers to a color frame of a monochrome or a mixed color displayed in a middle of a gray-scale picture, wherein the color frame causes color changes of gray-scale in upper and lower regions. A degree of crosstalk can be determined by measuring color coordinates, and color differences can also be detected visually. Only one column of sub pixels is connected to each of data lines in traditional stripe structures, and the liquid crystal display panels usually adopt a driving mode of the column inversion. At this time, the color crosstalk easily occurs due to asymmetric coupling effects of the data lines to the sub pixels.

SUMMARY OF INVENTION

The present application provides a liquid crystal display panel and a display device to solve a technical problem of color crosstalk caused by asymmetric coupling effects of data lines to sub pixels in existing liquid crystal display panels.

The application provides a liquid crystal display panel, including:
 a plurality of scanning lines, wherein the plurality of scanning lines are disposed along a first direction;
 a plurality of data lines, wherein the plurality of data lines are disposed along a second direction, and the second direction intersects the first direction; and
 a plurality of sub pixels, wherein the plurality of sub pixels are disposed in an array, and colors of the sub pixels in each column are same; polarities of the sub pixels in each column are changed every k rows, polarities of two adjacent ones of the sub pixels in each row are opposite, and k is an integer greater than or equal to 1,
 wherein along the second direction, the sub pixels in an $n^{th}$ column are correspondingly connected to two adjacent ones of the data lines located on a left side and a right side of the sub pixels in the $n^{th}$ column; one of the two adjacent ones of the data lines is electrically connected to positive sub pixels of the sub pixels in the $n^{th}$ column, and another one of the two adjacent ones of the data lines is electrically connected to negative sub pixels of the sub pixels in the $n^{th}$ column; every two of the data lines transmitting data voltages with same polarities and electrically connected to the sub pixels of a same color are connected together, and n is an integer greater than or equal to 1.

Alternatively, in some embodiments of the present application, each of the sub pixels comprises a first sub pixel, a second sub pixel, and a third sub pixel, the first sub pixel, the second sub pixel, and the third sub pixel have different colors, and in a same row of the sub pixels, the first sub pixels, the second sub pixels, and the third sub pixels are repeatedly disposed in any permutation and combination.

Alternatively, in some embodiments of the present application, along the second direction, a $(2m)^{th}$ data line is electrically connected to a $(2m+5)^{th}$ data line, and m is an integer greater than or equal to 1.

Alternatively, in some embodiments of the present application, the liquid crystal display panel comprises connecting lines, and the connecting lines and the data lines are disposed in different layers; the connecting lines extend along the second direction, and the $(2m)^{th}$ data line is electrically connected to the $(2m+5)^{th}$ data line through a corresponding one of the connecting lines.

Alternatively, in some embodiments of the present application, along the first direction, the liquid crystal display panel comprises a first non-display area, a second non-display area, and a display area disposed between the first non-display area and the second non-display area, the plurality of sub pixels are located in the display area, and the plurality of the connecting lines are located in the first non-display area and/or the second non-display area.

Alternatively, in some embodiments of the present application, each of the connecting lines is located between two adjacent rows of the sub pixels.

Alternatively, in some embodiments of the present application, the liquid crystal display panel comprises connecting lines, the connecting lines and the data lines are disposed in different layers, and the connecting lines extend along the second direction; the $(2m)^{th}$ data line is electrically connected to the $(2m+5)^{th}$ data line through a corresponding one of the connecting lines, the $(2m)^{th}$ data line and the connecting lines are disposed in a same layer, and the $(2m)^{th}$ data line and a $(2m-1)^{th}$ data line are disposed in different layers.

Alternatively, in some embodiments of the present application, along the first direction, the liquid crystal display panel comprises a first non-display area, a second non-display area, and a display area disposed between the first non-display area and the second non-display area; the plurality of sub pixels are located in the display area, and the plurality of the connecting lines are located in the first non-display area and/or the second non-display area.

Alternatively, in some embodiments of the present application, each of the connecting lines is located between two adjacent rows of the sub pixels.

Alternatively, in some embodiments of the present application, an extension length of each of the data lines along the first direction is greater than or equal to an extension length of the sub pixels in each column along the first direction.

Alternatively, in some embodiments of the present application, along the second direction, a $(2m)^{th}$ data line is electrically connected to a $(2m+17)^{th}$ data line, and m is an integer greater than or equal to 1.

Alternatively, in some embodiments of the present application, in the same row of the sub pixels, the first sub pixels, the second sub pixels, and the third sub pixels are repeatedly disposed in a permutation and combination;

along the second direction, a $(2m)^{th}$ data line corresponding to the first sub pixels is electrically connected to a $(2m+17)^{th}$ data line, $(2m)^{th}$ data lines corresponding to the second sub pixels and the third sub pixels are all electrically connected to a $(2m+5)^{th}$ data line, and m is an integer greater than or equal to 1.

Correspondingly, the present application further provides a display device, wherein the display device includes a liquid crystal display panel and a source driver chip, the source driver chip is connected to a plurality of data lines configured to provide data voltage to the liquid crystal display panel, and the liquid crystal display panel includes:

a plurality of scanning lines, wherein the plurality of scanning lines are disposed along a first direction;

a plurality of data lines, wherein the plurality of data lines are disposed along a second direction, and the second direction intersects the first direction; and a plurality of sub pixels, wherein the plurality of sub pixels are disposed in an array, and colors of the sub pixels in each column are same; polarities of the sub pixels in each column are changed once every k rows, polarities of two adjacent ones of the sub pixels in each row are opposite, and k is an integer greater than or equal to 1, wherein along the second direction, the sub pixels in an $n^{th}$ column are correspondingly connected to two adjacent ones of the data lines located on a left side and a right side of the sub pixels in the $n^{th}$ column; one of the two adjacent ones of the data lines is electrically connected to positive sub pixels of the sub pixels in the $n^{th}$ column, and another one of the two adjacent ones of the data lines is electrically connected to negative sub pixels of the sub pixels in the $n^{th}$ column; every two of the data lines transmitting data voltages with same polarities and electrically connected to the sub pixels of a same color are connected together, and n is an integer greater than or equal to 1.

Alternatively, in some embodiments of the present application, along the second direction, a $(2m)^{th}$ data line is electrically connected to the source driver chip or a $(2m-1)^{th}$ data line is electrically connected to the source driver chip, and m is an integer greater than or equal to 1.

Alternatively, in some embodiments of the present application, each of the sub pixels comprises a first sub pixel, a second sub pixel, and a third sub pixel; the first sub pixel, the second sub pixel, and the third sub pixel have different colors, and in a same row of the sub pixels, the first sub pixels, the second sub pixels, and the third sub pixels are repeatedly disposed in any permutation and combination.

Alternatively, in some embodiments of the present application, along the second direction, a $(2m)^{th}$ data line is electrically connected to a $(2m+5)^{th}$ data line, and m is an integer greater than or equal to 1.

Alternatively, in some embodiments of the present application, the liquid crystal display panel comprises connecting lines, and the connecting lines and the data lines are disposed in different layers; the connecting lines extend along the second direction, and the $(2m)^{th}$ data line is electrically connected to the $(2m+5)^{th}$ data line through a corresponding one of the connecting lines.

Alternatively, in some embodiments of the present application, along the first direction, the liquid crystal display panel comprises a first non-display area, a second non-display area, and a display area disposed between the first non-display area and the second non-display area, the plurality of sub pixels are located in the display area, and the plurality of the connecting lines are located in the first non-display area and/or the second non-display area.

Alternatively, in some embodiments of the present application, each of the connecting lines is located between two adjacent rows of the sub pixels.

Alternatively, in some embodiments of the present application, the liquid crystal display panel comprises connecting lines, the connecting lines and the data lines are disposed in different layers, and the connecting lines extend along the second direction; the $(2m)^{th}$ data line is electrically connected to the $(2m+5)^{th}$ data line through a corresponding one of the connecting lines, the $(2m)^{th}$ data line and the connecting lines are disposed in a same layer, and the $(2m)^{th}$ data line and a $(2m-1)^{th}$ data line are disposed in different layers.

The present application provides the liquid crystal display panel and the display device. The liquid crystal display panel includes the plurality of scanning lines, the plurality of data lines, and the plurality of sub pixels. Wherein the colors of the sub pixels in each column are same, the polarities of the sub pixels in each column are changed every k rows, the polarities of the two adjacent ones of the sub pixels in each row are opposite. Along the second direction, the sub pixels in the $n_{th}$ column are correspondingly connected to the two adjacent ones of the data lines located on the left side and the right side of the sub pixels in the $n^{th}$ column, one of the two adjacent ones of the data lines is electrically connected to the positive sub pixels of the sub pixels in the $n_{th}$ column, another one of the two adjacent ones of the data lines is electrically connected to the negative sub pixels of the sub pixels in the $n^{th}$ column, every two of the data lines transmitting the data voltages with same polarities and electrically connected to the sub pixels of the same color are connected together, and k and n are both an integer greater than or equal to 1. Through above settings, the data lines on both sides of a same column of the sub pixels transmit data voltage with different polarities, so that the coupling effects of the data lines to the sub pixels are at least partially offset, thereby avoiding the color crosstalk in display screen. Meanwhile, the above setting avoids problems of insufficient charging of solid-colored screen caused by a traditional data line connected to two different polarity ones of the sub pixels and an increase of a number of source driver chips caused by an increase of a number of data lines.

BRIEF DESCRIPTION OF DRAWINGS

In order to clearly explain technical solutions in embodiments of the present application, the following will briefly introduce drawings needed to be used in descriptions of the embodiments. It is obvious that the drawings in the following descriptions are only some embodiments of the present application. For those skilled in the art, other drawings can be obtained according to these drawings without paying creative labor.

DETAILED DESCRIPTION OF EMBODIMENTS

Technical schemes in embodiments of the present application will be described clearly and completely below in combination with attached drawings in the embodiments of the present application. Obviously, the described embodiments are only part of the embodiments of the present application, not all of the embodiments. Based on the embodiments in the present application, all other embodiments obtained by those skilled in the art without creative work belong to a scope of a protection of the present application.

In description of the present application, it should be understood that terms "first" and "second" are only used for descriptive purposes and cannot be understood as indicating or implying relative importance or implicitly indicating a number of indicated technical features. Therefore, features defining "first" and "second" can explicitly or implicitly include one or more of the features, so it cannot be understood as a limitation of the present application.

The present application provides a liquid crystal display panel and a display device, which are described in detail below. It should be noted that an order of description of the following embodiments does not limit a preferred order of the embodiments of the present application.

Figure 1:
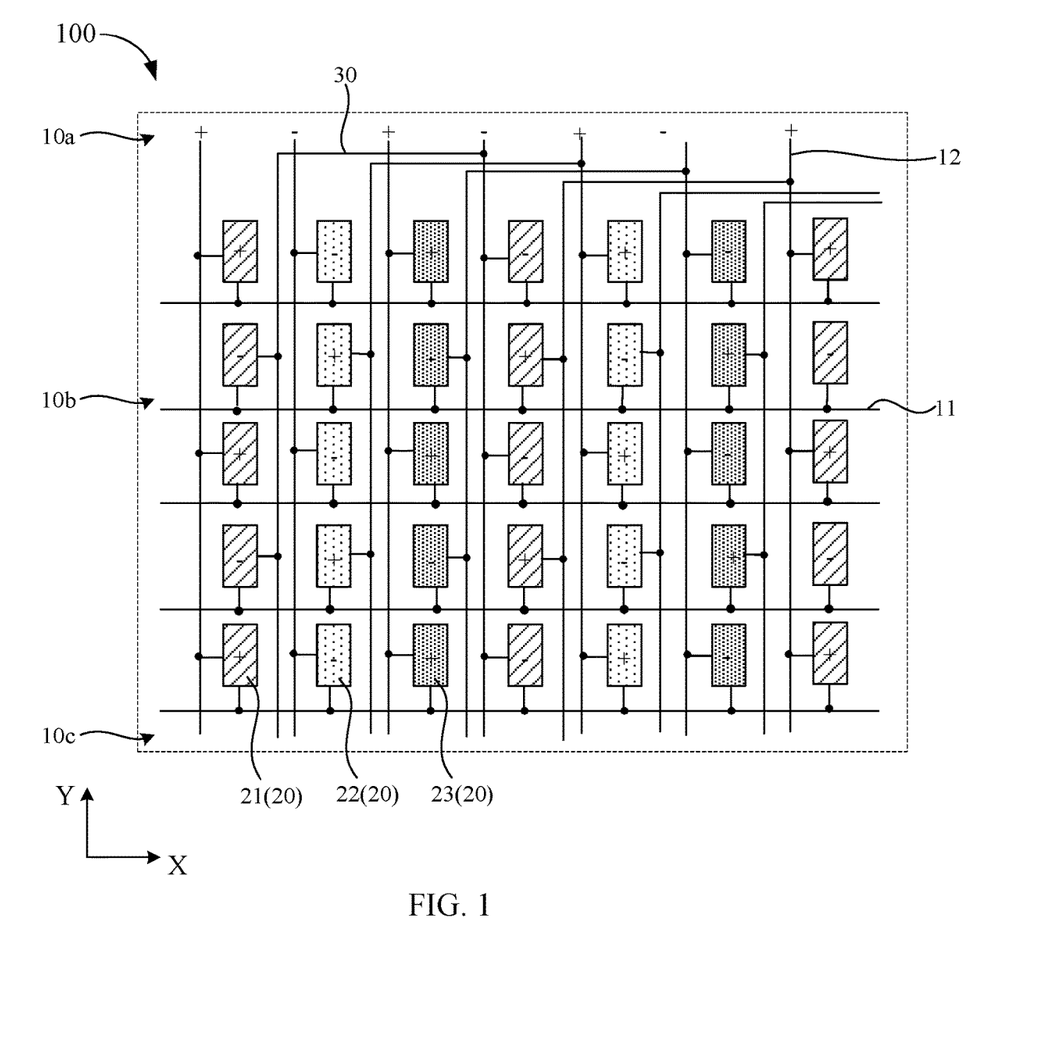
FIG. 1 is a first partial schematic structural diagram of a liquid crystal display panel provided by the present application.

Please refer to FIG. 1, FIG. 1 is a first partial schematic diagram of a liquid crystal display panel provided by the present application. In an embodiment of the present application, the liquid crystal display panel 100 includes a plurality of scanning lines 11, a plurality of data lines 12, and a plurality of sub pixels 20.

Wherein the plurality of scanning lines 11 are disposed along a first direction Y, the plurality of data lines 12 are disposed along a second direction X, and the second direction X intersects the first direction Y. The plurality of sub pixels 20 are disposed in an array. Colors of the sub pixels 20 in each column are same. Polarities of the sub pixels 20 in each column are changed every k rows. Polarities of two adjacent ones of the sub pixels 20 in each row are opposite, and k is an integer greater than or equal to 1.

Wherein along the second direction X, the sub pixels 20 in an $n^{th}$ column are correspondingly connected to two adjacent ones of the data lines 12 located on a left side and a right side of the sub pixels 20 in the $n^{th}$ column, and one of the two adjacent ones of the data lines 12 is electrically connected to positive sub pixels of the sub pixels 20 in the $n^{th}$ column, and another one of the two adjacent ones of the data lines 12 is electrically connected to negative sub pixels of the sub pixels 20 in the $n^{th}$ column. Every two of the data lines 12 transmitting data voltages with same polarities and electrically connected to the sub pixels 20 of a same color are connected together, and n is an integer greater than or equal to 1.

It should be noted that in order to avoid that liquid crystal molecules can no longer rotate according to changes of electric fields due to destruction of characteristics, a data voltage with opposite polarities should be applied to liquid crystals, so as to drive the liquid crystals to rotate. Therefore, the opposite polarities mentioned in the embodiment of the present application mean that those polarities of the data voltage received by two of the sub pixels 20 are opposite. Wherein the positive sub pixels refer to the sub pixels 20 which receive positive data voltages, and the negative sub pixels refer to the sub pixels 20 which receive negative data voltages.

Through above settings, the data lines 12 on both sides of a same column of the sub pixels 20 transmit data voltages with different polarities, so that coupling effects of the data lines 12 to the sub pixels 20 are at least partially offset, thereby preventing color crosstalk in display screen.

In addition, on one hand, when a traditional one of the data lines 12 is connected to the sub pixels with different polarities, it is easy for the sub pixels 20 to be insufficiently charged due to alternating changes of data voltages of positive and negative polarities. However, in the embodiment of the present application, since the sub pixels 20 with same colors and same polarities are connected to a same one of the data lines 12, a problem of the insufficient charging of solid-colored screen caused by the traditional one of the data lines 12 connected to the sub pixels 20 with two different polarities can be prevented. On another hand, since every two of the data lines 12 transmitting data voltages with same polarities and electrically connected to the sub-pixels 20 of a same color are connected together, an increase of a number of source driver chips caused by an increase of a number of the data lines 12 can be prevented, thereby reducing cost.

For ease of understanding, the present application provides a specific embodiment for description.

Figure 2:
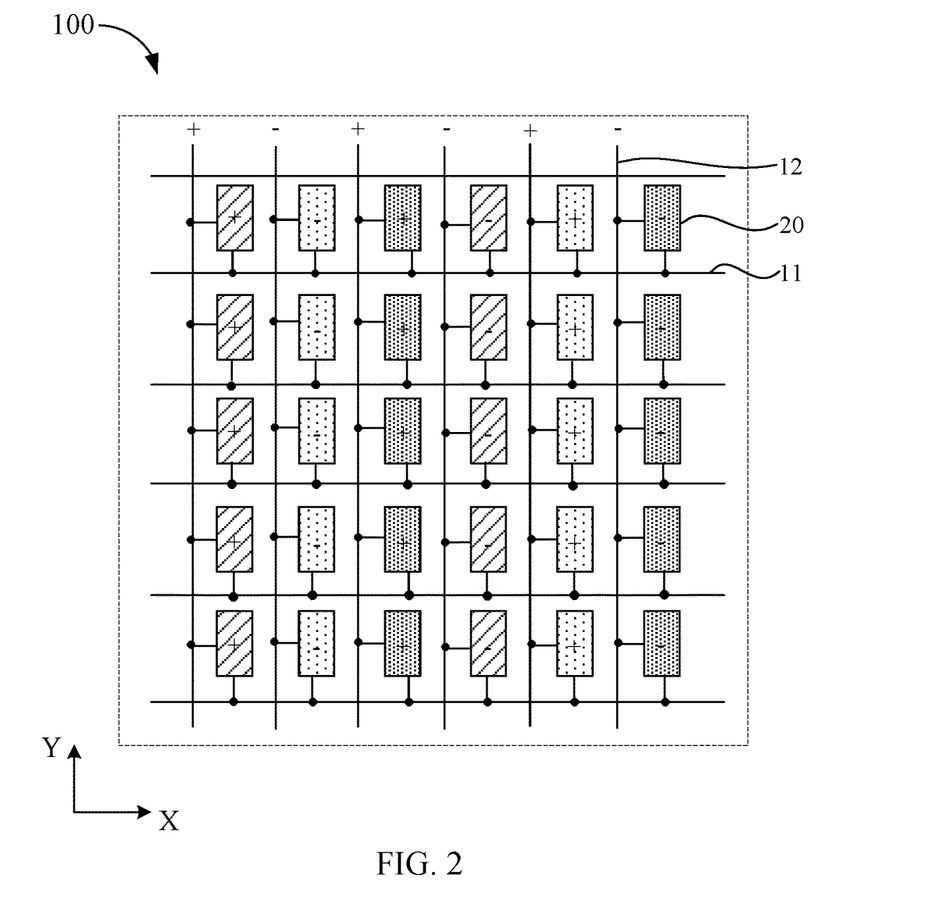
FIG. 2 is a partial schematic structural diagram of a liquid crystal display panel in the prior art provided by the present application.
Figure 3:
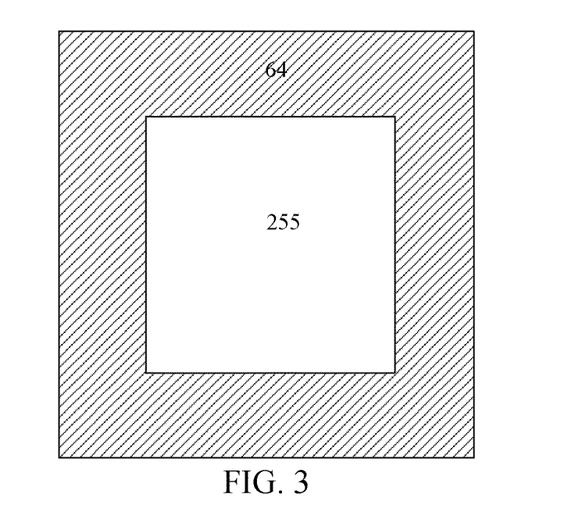
FIG. 3 is a schematic diagram for detecting performance of a display panel provided by the present application.
Figure 4:
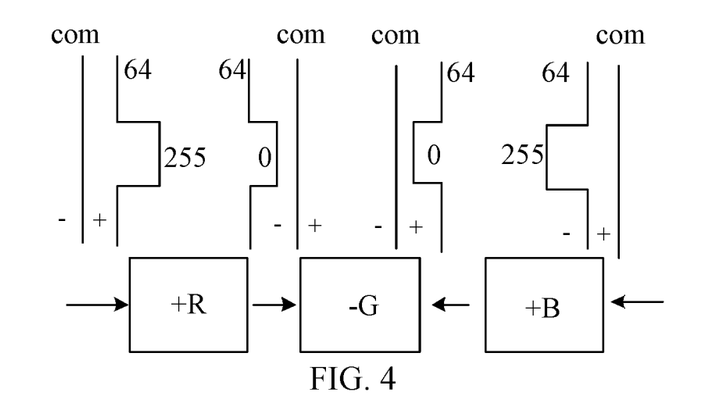
FIG. 4 is a schematic diagram of sub pixels in FIG. 2 under a coupling effect of data lines provided by the present application.

Referring to FIG. 2 to FIG. 4. FIG. 2 is a partial schematic diagram of a liquid crystal display panel in the prior art provided by the present application, FIG. 3 is a schematic diagram for detecting performance of the display panel provided by the present application, and FIG. 4 is a schematic diagram of sub pixels in FIG. 2 under a coupling effect of data lines provided by the present application.

As shown in FIG. 2, the liquid crystal display panel in the prior art adopts a driving mode of a stripe structure with a column inversion. Wherein an embodiment of the present application takes a repeated arrangement in a permutation and combination of red sub pixels, green sub pixels, and blue sub pixels in a same row of the sub pixels 20 as an example. Wherein the colors of the sub pixels 20 in each column are same, the polarities of the sub pixels 20 in each column are same, and the polarities of two adjacent ones of the sub pixels 20 in each row of the sub pixels 20 are opposite.

It can be understood that there exists parasitic capacitance between the data lines 12 and pixel electrodes of the sub pixels 20. When the data voltage transmitted by the data lines 12 jumps, a potential of the pixel electrodes of the sub pixels 20 will be changed due to capacitance coupling. For example, along the first direction Y, when a first one of the scanning lines 11 starts scanning, a pixel electrode of a first one of the sub pixels 20 receives a data voltage output by a first one of the data lines 12; then, when a second one of the scanning lines 11 starts scanning, one of the data lines 12 adjacent to the first one of the sub pixels 20 transmits a data voltage required by another one of the sub pixels 20, which may not be equal to the data voltage received by the first one of the sub pixels 20. Due to a coupling effect of capacitance, the potential of the pixel electrode of the first one of the sub pixels 20 will be pulled up or down. Since the data lines 12 are distributed left-and-right on both sides of the sub pixels 20, the sub pixels 20 will be under the coupling effects on both left and right sides of the data lines 12 at a same time.

As shown in FIG. 3, in a case of normal display, a detecting diagram includes a gray screen represented by 64 gray scale in a periphery and a red screen represented by 255 gray scale in a middle.

As shown in FIG. 4, in a case of abnormal display, what can be determined from a jump relationship of data voltages on both sides of the sub pixels 20 with different colors is: for positive ones of the red sub pixels, directions of the coupling effects on both sides of the data lines 12 to the positive ones of the red sub pixels are same, that is, the coupling effects are superimposed, which has a great influence on the red sub pixels; for negative ones of the green sub pixels, directions of the coupling effects on both sides of the data lines 12 to the negative ones of the green sub pixels are opposite, that is, the coupling effects offset or partially offset, which has a relatively slight influence on the green sub pixels; and for the positive ones of the red sub pixels, the directions of the coupling effects on both sides of the data lines 12 to the positive ones of the red sub pixels are same, that is, the coupling effects are superimposed, which has a great influence on the blue sub pixels. By analogy, gray scales of upper and lower regions in red frames will change in color, resulting in the color crosstalk.

Figure 5:
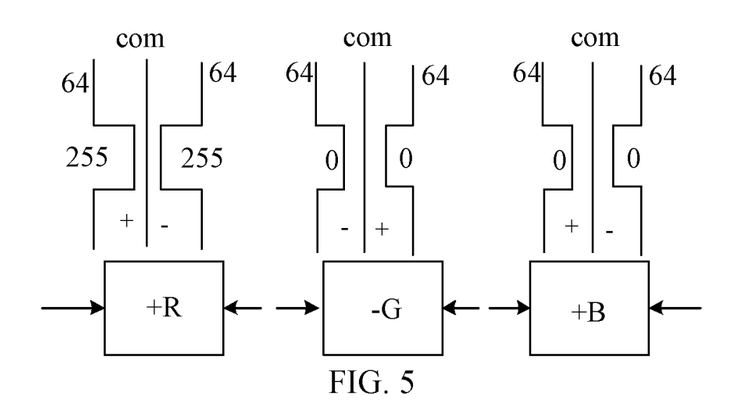
FIG. 5 is a schematic diagram of sub pixels in FIG. 1 under a coupling effect of data lines provided by the present application.

For the embodiment of the present application, please refer to FIG. 1, FIG. 3, and FIG. 5 at a same time. FIG. 5 is a schematic diagram of the sub pixels in FIG. 1 under a coupling effect of the data lines provided by the present application. In the embodiment of the present application, the data lines 12 located on both sides of a same column of the sub pixels 20 transmit data voltages with different polarities, so that the coupling effects of the data lines 12 to the red sub pixels, the green sub pixels, and the blue sub pixels are at least partially offset, thereby preventing the color crosstalk in the display screen.

In the embodiment of the present application, each of the sub pixels 20 includes a first sub pixel 21, a second sub pixel 22, and a third sub pixel 23. Wherein the first sub pixel 21, the second sub pixel 22, and the third sub pixel 23 have different colors, and in a same row of the sub pixels 20, the first sub pixels 21, the second sub pixels 22, and the third sub pixels 23 are repeatedly disposed in any permutation and combination.

Wherein the first sub pixels 21, the second sub pixels 22, and the third sub pixels 23 can all be the red sub pixels, the green sub pixels, the blue sub pixels, white sub pixels, and yellow sub pixels, etc. As long as the first sub pixel 21, the second sub pixel 22, and the third sub pixel 23 can display different colors in a combination and support a normal display screen of the liquid crystal display panel 100, it is not specifically limited by the present application here.

For example, in some embodiments of the present application, the first sub pixels 21, the second sub pixels 22, and the third sub pixels 23 are all the red sub pixels, the blue sub pixels, or the green sub pixels. In a same row of the sub pixels 20, a plurality of the first sub pixels 21, the second sub pixels 22, and the third sub pixels are repeatedly disposed in any permutation and combination of RGB, RBG, BGR, BRG, GRB, and GBR, etc.

Of course, in the embodiment of the present application, the plurality of sub pixels 20 can also include not only three colors of the sub pixels, as long as it conforms to a technical scheme of the embodiment of the present application.

It should be noted that following embodiments of the present application take the first sub pixels 21 as the red sub pixels, the second sub pixels 22 as the green sub pixels, and the third sub pixels 23 as the blue sub pixels as examples, but it cannot be understood as limitation to the present application here.

Please continue to refer to FIG. 1. In the embodiment of the present application, along the second direction X, a $(2m)^{th}$ data line 12 is electrically connected to a $(2m+5)^{th}$ data line 12, and m is an integer greater than or equal to 1. For example, when m is equal to 1, a second data line 12 is electrically connected to a seventh data line 12; when m is equal to 2, the second data line 12 is electrically connected to a ninth data line 12; and when m is equal to 3, a third data line 12 is electrically connected to an eleventh data line 12. By analogy, it can be achieved that every two of the data lines 12 transmitting data voltages with same polarities and electrically connected to the sub pixels 20 of a same color are connected together.

It should be noted that along the second direction X, last five ones of the data lines 12 can exist independently, or can be connected to the first one of the data lines 12 or connected to each other. Specifically, it can be disposed according to polarities of data voltages transmitted by the last five ones of the data lines 12 and the first one of the data lines 12.

The embodiment of the present application connects two adjacent ones of the data lines 12 connected to the sub pixels 20 of the same color and transmitting data voltages of opposite polarities together, wherein one of the data lines 12 can be electrically connected to the source driver chips, so as to save the number of the source driver chips.

Further, in the embodiment of the present application, the liquid crystal display panel 100 includes connecting lines 30. The $(2m)^{th}$ data line 12 is electrically connected to the $(2m+5)^{th}$ data line 12 through a corresponding one of the connecting lines 30. The connecting lines 30 extend along the second direction X, and the connecting lines 30 and the data lines 12 are disposed in different layers.

Wherein the connecting lines 30 can be made of same materials as the data lines 12. The connecting lines 30 and the data lines 12 can be connected through vias. Only one of the connecting lines 30 can be disposed between every two connected ones of the data lines 12, or a plurality of the connecting lines 30 can be disposed to reduce impedance.

In the embodiment of the present application, the two adjacent ones of the data lines 12 are connected together, which can shorten a distance between the two adjacent ones of the data lines 12, so as to decrease lengths of the connecting lines 30 and reduce signal loss caused by resistance of routings. Meanwhile, an above setting can prevent poor signal transmission caused by longer lengths of the routings.

Alternatively, in some embodiments of the present application, the $(2m)^{th}$ data line 12 and the connecting lines 30 are disposed in a same layer, and the $(2m)^{th}$ data line 12 and a $(2m-1)^{th}$ data line 12 are disposed in different layers. Each of the sub pixels 20 is electrically connected to the $(2m)^{th}$ data line 12 through a via. Each of the connecting lines 30 is electrically connected to the $(2m-1)^{th}$ data line 12 through a via.

It can be understood that since every two adjacent ones of the data lines 12 are correspondingly connected to the sub pixels 20 in the $n^{th}$ column, the number of the data lines 12 in the liquid crystal display panel 100 increases. An increase in the number of the data lines 12 can easily lead to a denser arrangement of the data lines 12, resulting in signal crosstalk or an enhanced coupling effect. By disposing the $(2m)^{th}$ data line 12 and the $(2m-1)^{th}$ data line 12 in the different layers, the embodiment of the present application can prevent short circuit or generation of the signal crosstalk between the two adjacent ones of the data lines 12.

Further, the $(2m)^{th}$ data line 12 can be overlapped with the $(2m-1)^{th}$ data line 12 in the different layers and in a one-to-one correspondence. In this way, a space occupied by the data lines 12 in the second direction X can be reduced, so as to improve a pixel aperture ratio.

In the embodiment of the present application, along the first direction Y, the liquid crystal display panel 100 includes a first non-display area 10a, a second non-display area 10b, and a display area 10c disposed between the first non-display area 10a and the second non-display area 10b. The plurality of sub pixels 20 are located in the display area 10c. The plurality of connecting lines 30 are located in the first non-display area 10a or the second non-display area 10b.

Wherein the embodiment of the present application can dispose all of the plurality of connecting lines 30 in the first non-display area 10a or the second non-display area 10b. Therefore, a quantity of routings in the display area 10c can be decreased, thereby improving the pixel aperture ratio.

In the embodiment of the present application, k is equal to 1. That is, in the liquid crystal display panel 100, the polarities of the data lines 12 adopt a change mode of a column inversion to reduce power consumption of the source driver chips. However, due to a special connection mode of the data lines 12, the polarity of each of the sub pixels 20 in the liquid crystal display panel 100 is a 1-point inversion, so as to improve quality of the display screen.

Figure 6:
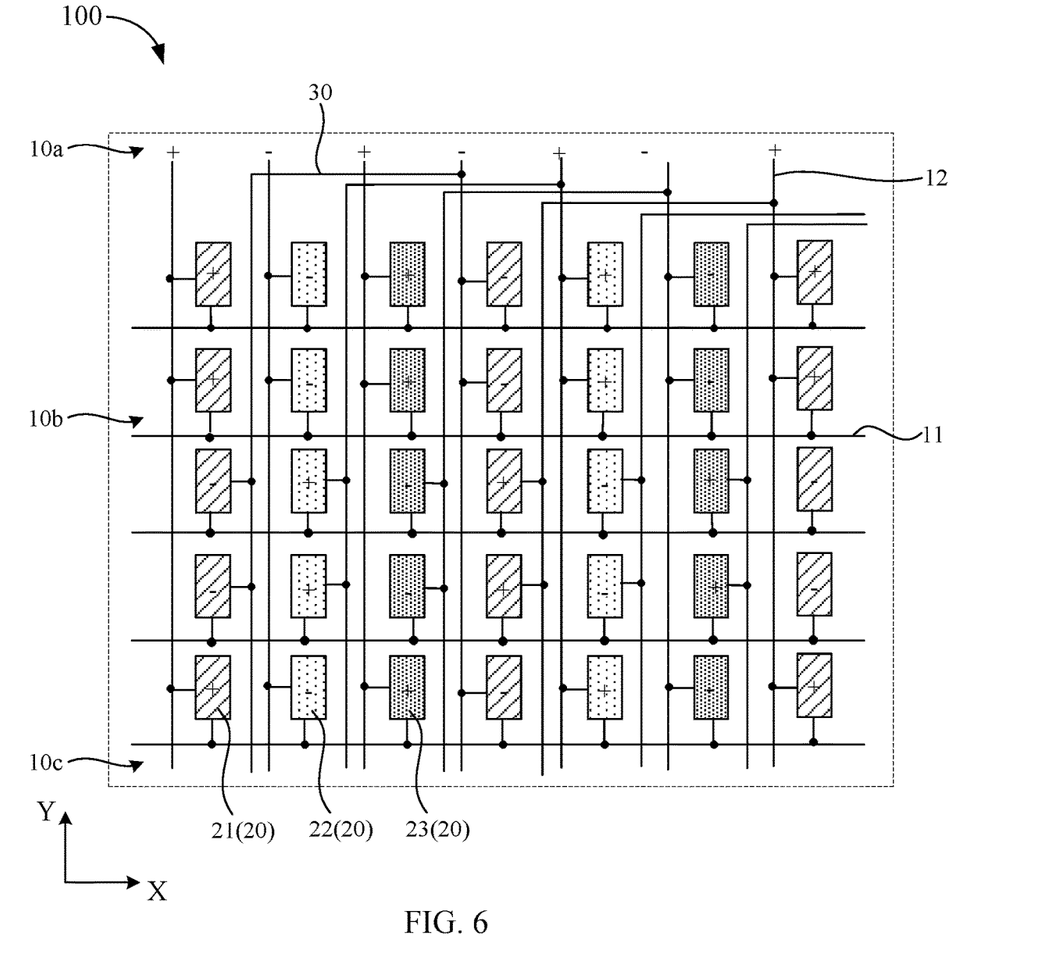
FIG. 6 is a second partial schematic structural diagram of the liquid crystal display panel provided by the present application.

Please refer to FIG. 6, FIG. 6 is a schematic diagram of a second partial structure of the liquid crystal display panel provided by the present application. A difference between an embodiment of the present application and the liquid crystal display panel 100 shown in FIG. 1 is that k is equal to 2. That is, in the embodiment of the present application, sub pixels 20 in each row of the liquid crystal display panel 100 adopt 1-point inversions and the sub pixels 20 in each column adopt 2-point inversions.

Since there is a large voltage difference between positive polarity data voltages and negative polarity data voltages corresponding to the 1-point inversions, power consumption is also relatively higher. Therefore, the embodiment of the present application adopts the 2-point inversions in column to improve the quality of the display screen and reduce the power consumption.

Of course, in other embodiments of the present application, a value of k can also be 3, 4, or 5, etc., and is not specifically limited by the present application.

Figure 7:
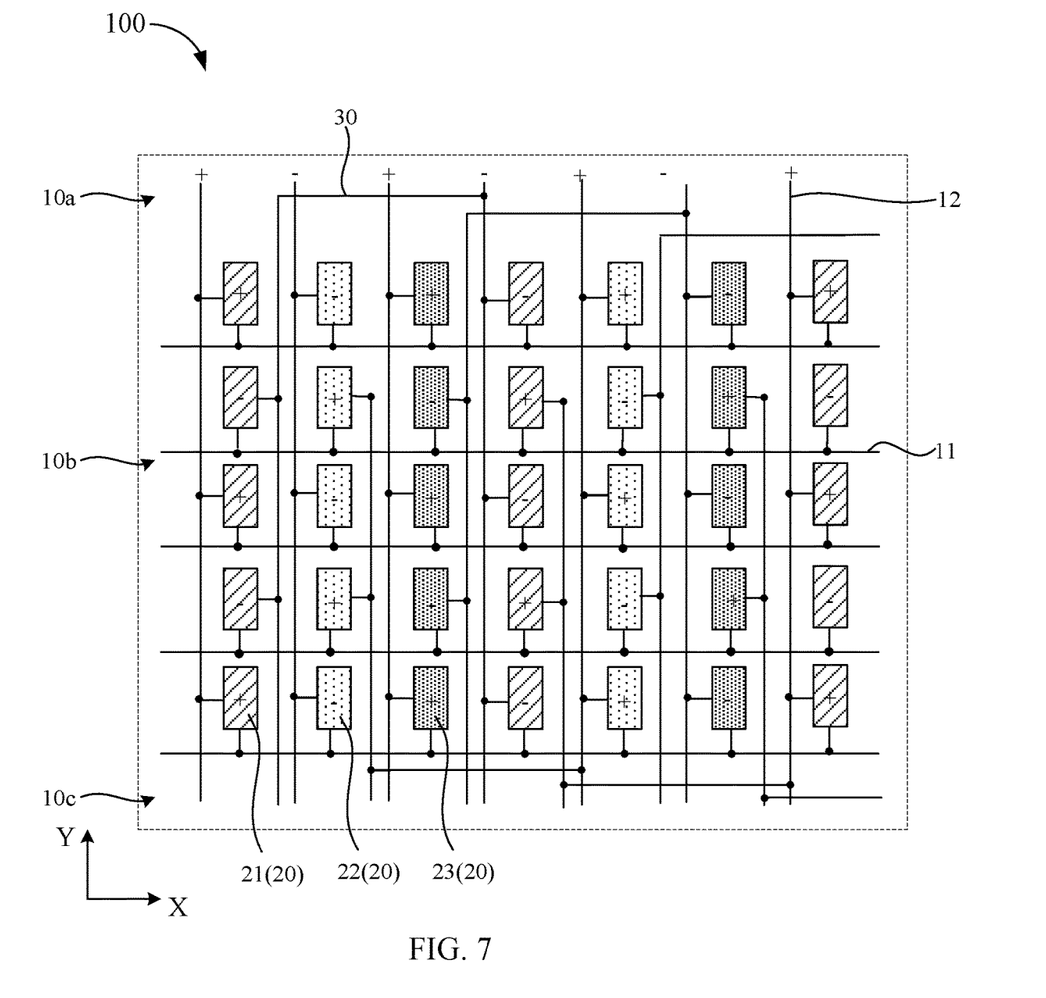
FIG. 7 is a third partial schematic structural diagram of the liquid crystal display panel provided by the present application.

Please refer to FIG. 7, FIG. 7 is a schematic diagram of a third partial structure of the liquid crystal display panel provided in the present application. A difference between an embodiment of the present application and the liquid crystal display panel 100 shown in FIG. 1 is that one part of connecting lines 30 is disposed in a first non-display area 10a and another part of the connecting lines 30 is disposed in a second non-display area 10b in the embodiment of the present application.

Specifically, a plurality of connecting lines 30 in the first non-display area 10a and the second non-display area 10b are disposed alternately in the embodiment of the present application. By disposing the plurality of connecting lines 30 in the first non-display area 10a and the second non-display area 10b alternately, the embodiment of the present application can decrease a density of routings in the first non-display area 10a and the second non-display area 10b, thereby preventing short circuit or signal crosstalk between two adjacent ones of the connecting lines 30. Meanwhile, widths of the connecting lines 30 can be increased according to an increase of areas of the first non-display area 10a and the second non-display area 10b, so as to reduce resistance.

Wherein in the embodiment of the present application, extension lengths of data lines 12 corresponding to the connecting lines 30 located in the second non-display area 10b are less than extension lengths of other ones of the data lines 12. On a basis of achieving offset of coupling effects of parts of sub pixels 20, a quantity of routings in the liquid crystal display panel 100 can be decreased.

Of course, in some embodiments of the present application, an extension length of each of the data lines 12 along a first direction Y is greater than or equal to extension lengths of the sub pixels 20 in each column along the first direction Y. Therefore, each of the sub pixels 20 can be coupled by two adjacent ones of the data lines 12 with data voltages with different polarities, and the coupling effects can be at least partially offset, which can greatly reduce possibility of color crosstalk.

Figure 8:
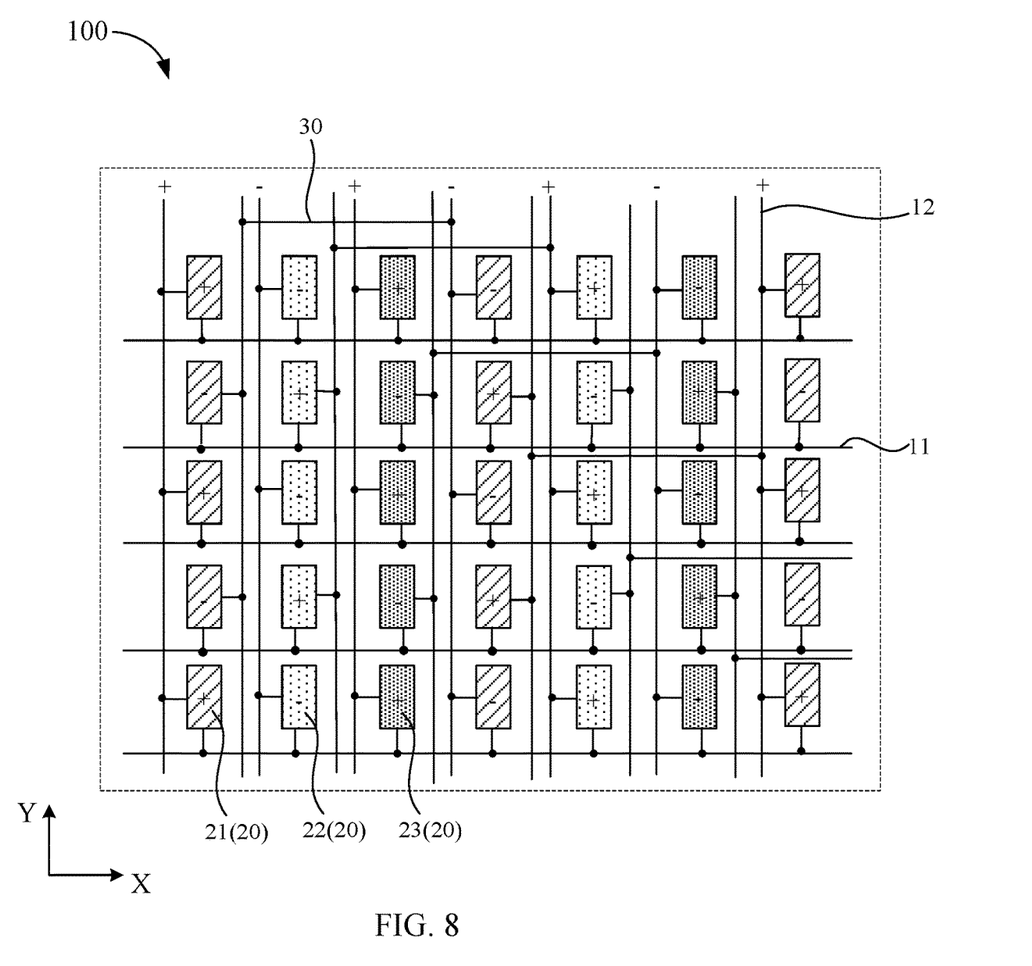
FIG. 8 is a fourth partial schematic structural diagram of the liquid crystal display panel provided by the present application.

Please refer to FIG. 8, FIG. 8 is a schematic diagram of a fourth partial structure of the liquid crystal display panel provided by the present application. A difference between an embodiment of the present application and the liquid crystal display panel 100 shown in FIG. 1 is that each of connecting lines 30 is located between two adjacent rows of sub pixels 20.

Specifically, when a number of data lines 12 is equal to a number of rows of the sub pixels 20, only one of the connecting lines 30 can be disposed between the two adjacent rows of the sub pixels 20 to prevent signal crosstalk. When the number of the data lines 12 is greater than the number of the rows of the sub pixels 20, at least the one of the connecting lines 30 can be disposed between the two adjacent rows of the sub pixels 20.

In the embodiment of the present application, each of the connecting lines 30 is disposed between the two adjacent rows of the sub pixels 20, so as to decrease a frame width of the liquid crystal display panel 100, thereby facilitating realization of a narrow frame.

Similarly, in some embodiments of the present application, an extension length of each of the data lines 12 along a first direction Y is greater than or equal to extension lengths of the sub pixels 20 in each column along the first direction Y. Therefore, each of the sub pixels 20 under a coupling effect of two adjacent ones of the data lines 12 having data voltages with different polarities, and coupling effects can be at least partially offset, which can greatly reduce possibility of color crosstalk.

Of course, in some embodiments of the present application, one part of the connecting lines 30 can also be disposed between the two adjacent rows of the sub pixels 20, and another part of the connecting lines 30 can be disposed in a first non-display area 10a or a second non-display area 10b. Specifically, it can be designed according to line arrangement of the liquid crystal display panel 100.

Figure 9:
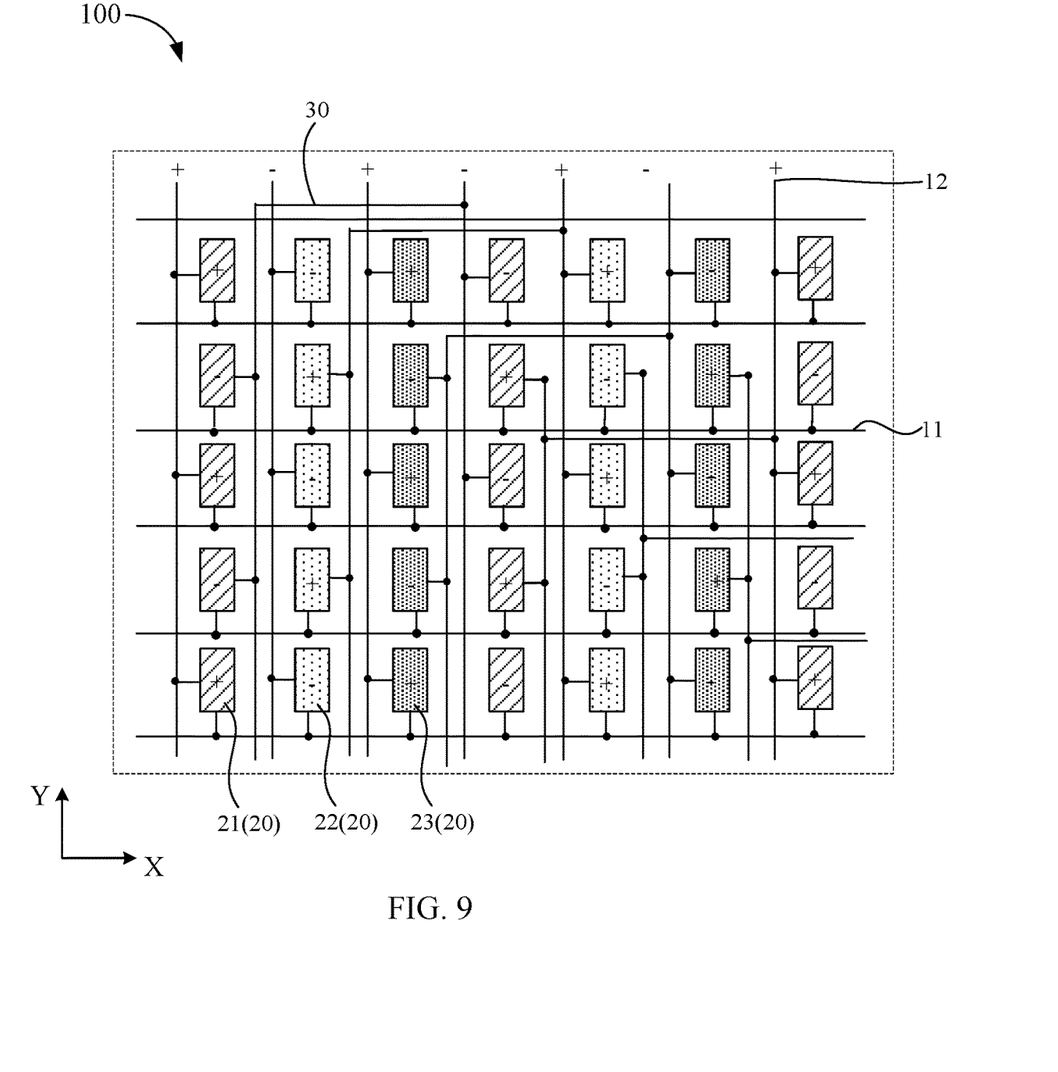
FIG. 9 is a fifth partial schematic structural diagram of the liquid crystal display panel provided by the present application.

Please refer to FIG. 9, FIG. 9 is a schematic diagram of a fifth partial structure of the liquid crystal display panel provided by the present application. A difference between an embodiment of the present application and the liquid crystal display panel 100 shown in FIG. 8 is: an extension length of a $(2m)^{th}$ data line 12 along a first direction Y can be adjusted according to positions of connecting lines 30. On a basis of achieving offset of coupling effects of parts of sub pixels 20, a quantity of routings in the liquid crystal display panel 100 can be decreased.

Figure 10:
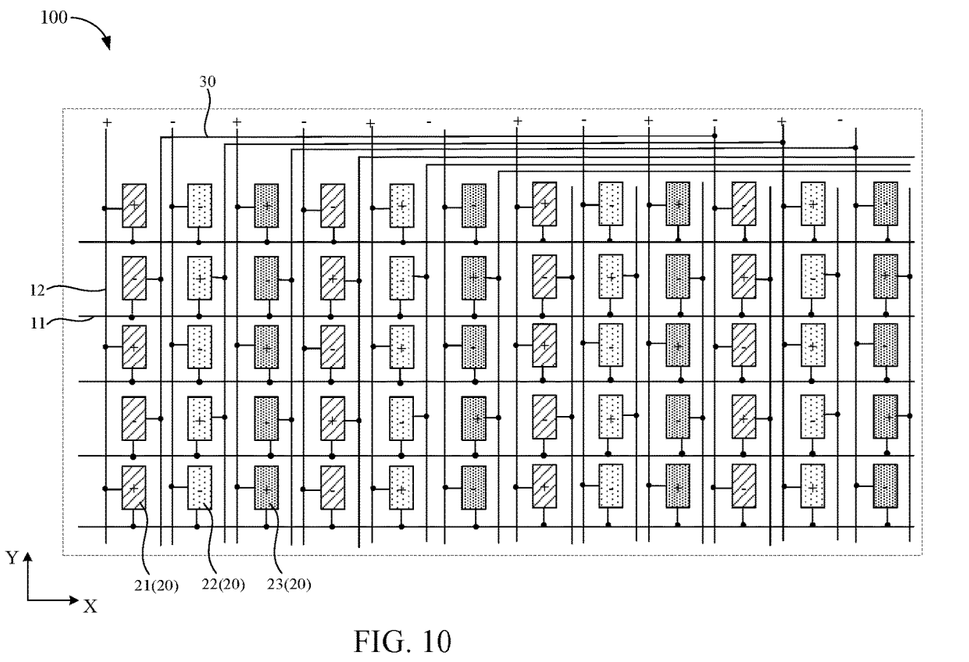
FIG. 10 is a sixth partial schematic structural diagram of the liquid crystal display panel provided by the present application.

Please refer to FIG. 10, FIG. 10 is a sixth partial schematic diagram of the liquid crystal display panel provided by the present application. A difference between an embodiment of the present application and the liquid crystal display panel 100 shown in FIG. 1 is that a $(2m)^{th}$ data line 12 is electrically connected to a $(2m+17)^{th}$ data line 12 along a second direction X, and m is an integer greater than or equal to 1.

For example, along the second direction X, when m is equal to 1, a second data line 12 is electrically connected to a $19^{th}$ data line 12; when m is equal to 2, the second data line 12 is electrically connected to a $21^{st}$ data line 12; and when m is equal to 3, a third data line 12 is electrically connected to a $23^{rd}$ data line 12. By analogy, it can be achieved that every two of the data lines 12 transmitting data voltages with same polarities and electrically connected to sub pixels 20 of a same color are connected together.

In the embodiment of the present application, between two connected ones of the data lines 12, there are two of the data lines 12 connecting the sub-pixels 20 of a same color. The embodiment of the present application provides a new connection mode of the data lines 12, so as to improve flexibility of connections of the data lines 12.

Of course, in some embodiments of the present application, between two connected ones of the data lines 12, there are more of the data lines 12 connecting the sub-pixels 20 of the same color, which will not be repeated here.

Figure 11:
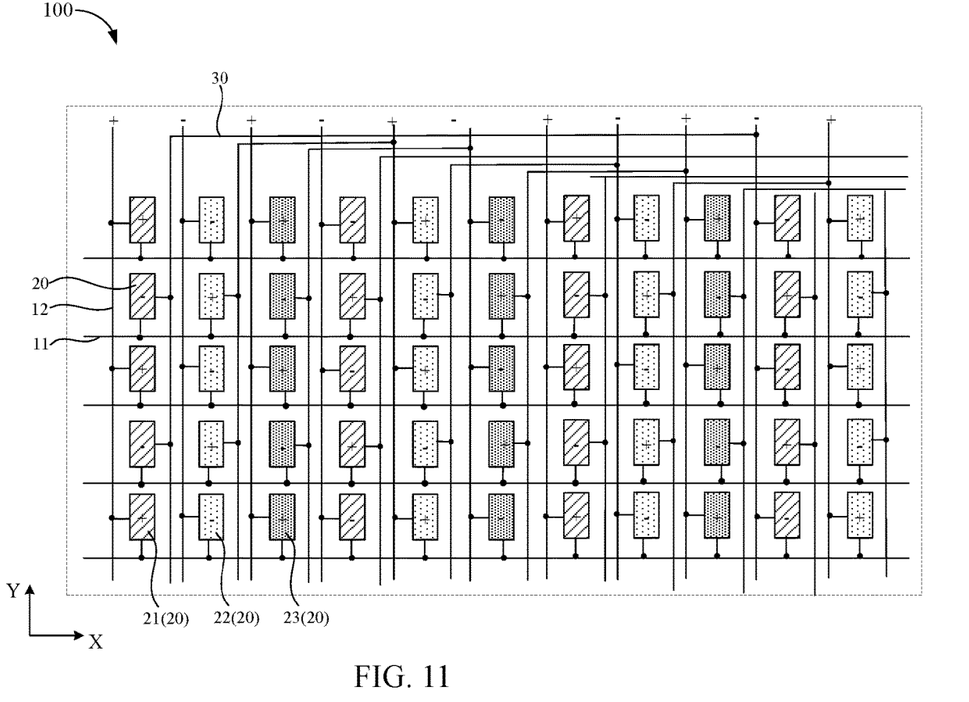
FIG. 11 is a seventh partial schematic structural diagram of the liquid crystal display panel provided by the present application.

In other embodiments of the present application, please refer to FIG. 11, FIG. 11 is a seventh partial schematic diagram of the liquid crystal display panel provided by the present application. Differences between an embodiment of the present application and the liquid crystal display panel 100 shown in FIG. 1 are: in the embodiment of the present application, in a same row of sub pixels 20, first sub pixels 21, second sub pixels 22, and third sub pixels 23 are repeatedly disposed in a permutation and combination. Along a second direction X, a $(2m)^{th}$ data line 12 corresponding to the first sub pixels 21 is electrically connected to a $(2m+17)^{th}$ data line 12, and $(2m)^{th}$ data lines 12 corresponding to the second sub pixels 22 and the third sub pixels 23 are electrically connected to a $(2m+5)^{th}$ data line 12, which will not listed here.

Compared with the above embodiments, data lines 12 are connected along the second direction X according to a same rule. The embodiment of the present application can adopt different connection modes to achieve connections of the data lines 12, so as to further improve flexibility of the connections of the data lines 12.

Accordingly, the present application also provides a display device, which includes a liquid crystal display panel and a source driver chip. The source driver chip is configured to provide data voltages to the liquid crystal display panel, and the liquid crystal display panel is the liquid crystal display panel 100 described in any of the above embodiments, which will not be repeated here.

In addition, the display device can be a smart phone, a tablet computer, an e-book reader, a smart watch, a camera, and a game console, etc., and is not limited by the present application here.

Figure 12:
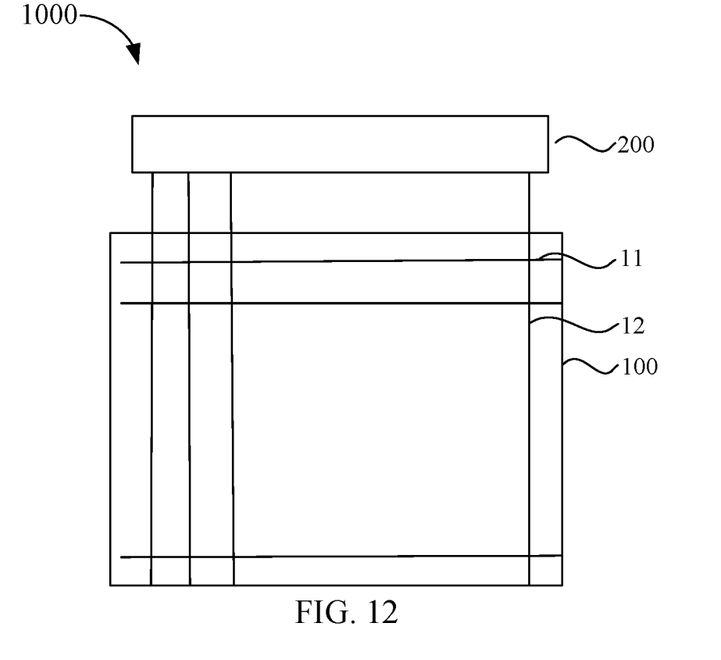
FIG. 12 is a schematic structural diagram of a display device provided by the present application.

Specifically, please refer to FIG. 12, FIG. 12 is a schematic structural diagram of the display device provided by the present application. The display device 1000 includes a liquid crystal display panel 100 and a source driver chip 200.

The liquid crystal display panel 100 includes a plurality of scanning lines 11 and a plurality of data lines 12; the plurality of scanning lines 11 are disposed in a first direction Y, and the plurality of data lines 12 are disposed along a second direction X. The liquid crystal display panel 100 also includes a plurality of sub pixels (not shown in drawings), and each of the sub pixels is electrically connected to a corresponding one of the scanning lines 11 and a corresponding one of the data lines 12.

Along the first direction Y, the source driver chip 200 can be disposed above the liquid crystal display panel 100, or be disposed below the liquid crystal display panel 100. A quantity of the source drive chip 200 can be one, two, or more. The source driver chip 200 transmits data signals to the liquid crystal display panel 100 through the data lines 12. In some embodiments, the source driver chip 200 can be bonded to the liquid crystal display panel 100 through a chip on film (COF), and is not specifically limited by the present application here.

Alternatively, in the display device 1000 of the embodiment of the present application, along the second direction X, a $(2m)^{th}$ data line 12 is electrically connected to the source drive chip 200, or a $(2m-1)^{th}$ data line 12 is electrically connected to the source drive chip 200, and m is an integer greater than or equal to 1. Therefore, since every two of the data lines 12 transmitting data voltages with same polarities and electrically connected to the sub pixels of a same color are connected together, an increase of a number of the source drive chip 200 caused by an increase of a number of the data lines 12 can be prevented, thereby reducing cost.

The present application provides the display device 1000. The display device 1000 includes the liquid crystal display panel 100. In the liquid crystal display panel 100, the data lines 12 located on both sides of a same column of the sub pixels transmit data voltages with different polarities, so that coupling effects of the data lines 12 to the sub pixels are at least partially offset, so as to prevent color crosstalk in display screen, thereby improving display quality of the display device 1000.

The above describes the liquid crystal display panel and the display device in the embodiments of the present application in detail. In this paper, specific examples are applied to explain a principle and implementation modes of the present application. The descriptions of the above embodiments are only used to help understand a method and a core idea of the present application; meanwhile, for those skilled in the art, there will be changes in the specific implementation modes and an application scope according to the idea of the present application. In conclusion, contents of the specification should not be understood as restrictions on the present application.

What is claimed is:

1. A liquid crystal display panel comprising:
    a plurality of scanning lines, wherein the plurality of scanning lines are disposed along a first direction and extend along a second direction;
    a plurality of data lines, wherein the plurality of data lines are disposed along the second direction and extend along the first direction, and the second direction intersects the first direction; and
    a plurality of sub pixels, wherein: the plurality of sub pixels are disposed in an array, and colors of the sub pixels in each column are same; polarities of the sub pixels in each column are changed every k rows, and k is an integer greater than or equal to 1; and polarities of two adjacent ones of the sub pixels in each row are opposite,
    wherein: along the second direction, the sub pixels in an $n^{th}$ column are correspondingly connected to two adjacent ones of the data lines located at a left side and a right side of the sub pixels in the $n^{th}$ column; one of the two adjacent ones of the data lines is electrically connected to positive sub pixels of the sub pixels in the $n^{th}$ column, and another one of the two adjacent ones of the data lines is electrically connected to negative sub pixels of the sub pixels in the $n^{th}$ column; every two of the data lines transmitting data voltages with same polarities and electrically connected to the sub pixels of a same color are connected together; n is an integer greater than or equal to 1; and a $(2m)^{th}$ data line is electrically connected to a $(2m+17)^{th}$ data line along the second direction, and m is an integer greater than or equal to 1.

2. The liquid crystal display panel according to claim 1, wherein each of the sub pixels comprises a first sub pixel, a second sub pixel, and a third sub pixel, and the first sub pixel, the second sub pixel, and the third sub pixel have different colors, and in a same row of the sub pixels, the first sub pixels, the second sub pixels, and the third sub pixels are repeatedly disposed in any permutation and combination.

3. The liquid crystal display panel according to claim 1, wherein:
    the liquid crystal display panel comprises connecting lines, and the connecting lines and the data lines are disposed in different layers; and the connecting lines extend along the second direction, and the $(2m)^{th}$ data line is electrically connected to the $(2m+17)^{th}$ data line through corresponding one of the connecting lines.

4. The liquid crystal display panel according to claim 3, wherein: along the first direction, the liquid crystal display panel comprises a first non-display area, a second non-display area, and a display area disposed between the first non-display area and the second non-display area; and the plurality of sub pixels are located in the display area, and the plurality of the connecting lines are located in the first non-display area and/or the second non-display area.

5. The liquid crystal display panel according to claim 3, wherein each of the connecting lines is located between two adjacent rows of the sub pixels.

6. The liquid crystal display panel according to claim 1, wherein: the liquid crystal display panel comprises connecting lines, the connecting lines extend along the second direction; and the $(2m)^{th}$ data line is electrically connected to the $(2m+17)^{th}$ data line through corresponding one of the connecting lines, the $(2m)^{th}$ data line and the connecting lines are disposed in a same layer.

7. The liquid crystal display panel according to claim 1, wherein an extension length of each of the data lines along the first direction is greater than or equal to an extension length of the sub pixels in each column along the first direction.

8. The liquid crystal display panel according to claim 1, wherein: the liquid crystal display panel comprises connecting lines extending along the second direction, and the connecting lines and the data lines are disposed in different layers; and
    the $(2m)^{th}$ data line is electrically connected to the $(2m+17)^{th}$ data line through corresponding one of the connecting lines.

9. The liquid crystal display panel according to claim 1, wherein the $(2m)^{th}$ data line and a $(2m-1)$th data line are disposed in different layers and overlapping with each other.

10. A liquid crystal display panel comprising:
    a plurality of scanning lines disposed along a first direction and extending along a second direction;
    a plurality of data lines disposed along the second direction and extending along the first direction, wherein the second direction intersects the first direction; and
    a plurality of sub pixels disposed in an array, wherein: colors of the sub pixels in each column are same; and polarities of the sub pixels in each column are changed every k rows, polarities of two adjacent ones of the sub pixels in each row are opposite, and k is an integer greater than or equal to 1,
    wherein: along the second direction, the sub pixels in an $n^{th}$ column are correspondingly connected to two adjacent ones of the data lines located at a left side and a right side of the sub pixels in the $n^{th}$ column; one of the two adjacent ones of the data lines is electrically connected to positive sub pixels of the sub pixels in the $n^{th}$ column, and another one of the two adjacent ones of the data lines is electrically connected to negative sub pixels of the sub pixels in the nth column; and n is an integer greater than or equal to 1, and
    wherein: in the same row of the sub pixels, the first sub pixels, the second sub pixels, and the third sub pixels are repeatedly disposed in a permutation and combination; and along the second direction, a $(2m)^{th}$ data line corresponding to the first sub pixels is electrically connected to a $(2m+17)^{th}$ data line, $(2m)^{th}$ data lines corresponding to the second sub pixels and the third sub pixels are all electrically connected to a $(2m+5)^{th}$ data line, and m is an integer greater than or equal to 1.

11. A display device, the display device comprising a liquid crystal display panel and a source driver chip, the source driver chip is connected to a plurality of data lines and configured to provide data voltages to the liquid crystal display panel, and the liquid crystal display panel comprises:
    a plurality of scanning lines, wherein the plurality of scanning lines are disposed along a first direction and extend along a second direction;
    a plurality of data lines, wherein the plurality of data lines are disposed along the second direction and extend along the first direction, and the second direction intersects the first direction; and
    a plurality of sub pixels, wherein: the plurality of sub pixels are disposed in an array, and colors of the sub pixels in each column are same; polarities of the sub pixels in each column are changed once every k rows, and k is an integer greater than or equal to 1; and polarities of two adjacent ones of the sub pixels in each row are opposite, wherein: along the second direction, the sub pixels in an $n^{th}$ column are correspondingly connected to two adjacent ones of the data lines located at a left side and a right side of the sub pixels in the $n^{th}$ column; one of the two adjacent ones of the data lines is electrically connected to positive sub pixels of the sub pixels in the $n^{th}$ column, and another one of the two adjacent ones of the data lines is electrically connected to negative sub pixels of the sub pixels in the $n^{th}$ column; every two of the data lines transmitting data voltages with same polarities and electrically connected to the sub pixels of a same color are connected together; n is an integer greater than or equal to 1; and a $(2m)^{th}$ data line is electrically connected to a $(2m+17)^{th}$ data line along the second direction, and m is an integer greater than or equal to 1.

12. The display device according to claim 11, wherein along the second direction, a $(2m)^{th}$ data line is electrically connected to the source driver chip or a $(2m-1)^{th}$ data line is electrically connected to the source driver chip, and m is an integer greater than or equal to 1.

13. The display device according to claim 11, wherein: each of the sub pixels comprises a first sub pixel, a second sub pixel, and a third sub pixel; and the first sub pixel, the second sub pixel, and the third sub pixel have different colors, and in a same row of the sub pixels, the first sub pixels, the second sub pixels, and the third sub pixels are repeatedly disposed in any permutation and combination.

14. The display device according to claim 11, wherein: the liquid crystal display panel comprises connecting lines, and the connecting lines and the data lines are disposed in different layers; and the connecting lines extend along the second direction, and the $(2m)^{th}$ data line is electrically connected to the $(2m+17)^{th}$ data line through corresponding one of the connecting lines.

15. The display device according to claim 14, wherein along the first direction, the liquid crystal display panel comprises a first non-display area, a second non-display area, and a display area disposed between the first non-display area and the second non-display area, the plurality of sub pixels are located in the display area, and the plurality of the connecting lines are located in the first non-display area and/or the second non-display area.

16. The display device according to claim 14, wherein each of the connecting lines is located between two adjacent rows of the sub pixels.

17. The display device according to claim 11, wherein: the liquid crystal display panel comprises connecting lines, the connecting lines extend along the second direction; and the $(2m)^{th}$ data line is electrically connected to the $(2m+17)^{th}$ data line through corresponding one of the connecting lines, the $(2m)^{th}$ data line and the connecting lines are disposed in a same layer.

18. The display device according to claim 11, wherein: the liquid crystal display panel comprises connecting lines extending along the second direction, and the connecting lines and the data lines are disposed in different layers; and the $(2m)^{th}$ data line is electrically connected to the $(2m+17)^{th}$ data line through corresponding one of the connecting lines.

19. The display device according to claim 11, the $(2m)^{th}$ data line and a $(2m-1)^{th}$ data line are disposed in different layers and overlapping with each other.

* * * * *